(12) United States Patent
Finamore

(10) Patent No.: US 6,969,545 B2
(45) Date of Patent: Nov. 29, 2005

(54) HYDROGEN STORAGE CONTAINER

(75) Inventor: Peter Finamore, Charlotte, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/628,221

(22) Filed: Jul. 28, 2003

(65) Prior Publication Data

US 2005/0025921 A1 Feb. 3, 2005

(51) Int. Cl.[7] .............................................. H01M 8/12
(52) U.S. Cl. ...................... 428/34.1; 428/34.4; 428/71
(58) Field of Search ......................... 428/35.7, 35.9, 428/36.5, 34.1, 34.4, 71; 206/0.6, 0.7

(56) References Cited

U.S. PATENT DOCUMENTS

| | | | |
|---|---|---|---|
| 6,425,251 B2 * | 7/2002 | Stetson et al. ................ | 62/46.2 |
| 6,627,148 B1 * | 9/2003 | Ovshinsky et al. ......... | 420/402 |
| 2004/0035401 A1 * | 2/2004 | Ramachandran et al. ... | 123/527 |

\* cited by examiner

*Primary Examiner*—Sandra M. Nolan-Rayford

(57) ABSTRACT

A container for storing hydrogen comprises an outer shell having an inlet for inputting hydrogen gas and an outlet for outputting hydrogen gas. A thermally conductive liner which is a carbon foam coating lines the interior of the outer shell. An inner hydride core is in communication with the inlet and outlet for storing the hydrogen gas.

9 Claims, 2 Drawing Sheets

HYDROGEN STORAGE CONTAINER

FIELD OF THE INVENTION

This invention relates to an improved storage container for gaseous fuels.

BACKGROUND OF THE INVENTION

Gaseous fuels may be stored in metallic or polymeric tanks. Gaseous fuels include hydrogen, methane, propane, ether, natural gas, acetylene, and other flammable gases or mixtures thereof. The storage capacity of a tank may be based upon the burst strength and maximum safe operating pressure of the tank over a defined ambient temperature range. To increase the storage capacity of a tank, hydrogen may be stored as a hydride. Hydride is a binary compound of hydrogen, usually formed with a more electropositive element. When a storage tank is filled with hydrogen, the hydrogen may be converted to a hydride. The hydride material expands during the filling with hydrogen gas and contracts during the release of the hydrogen gas. Accordingly, the life of the tank may be shortened by fatigue cracks from the foregoing expansion-contraction cycle.

SUMMARY OF THE INVENTION

A container for storing hydrogen comprises an outer shell having an inlet for inputting hydrogen gas and an outlet for outputting hydrogen gas. A thermally conductive liner lines an interior of the outer shell. An inner hydride core is in communication with the inlet and the outlet for storing the hydrogen gas.

DESCRIPTION OF THE PREFERRED EMBODIMENT

Figure 1:
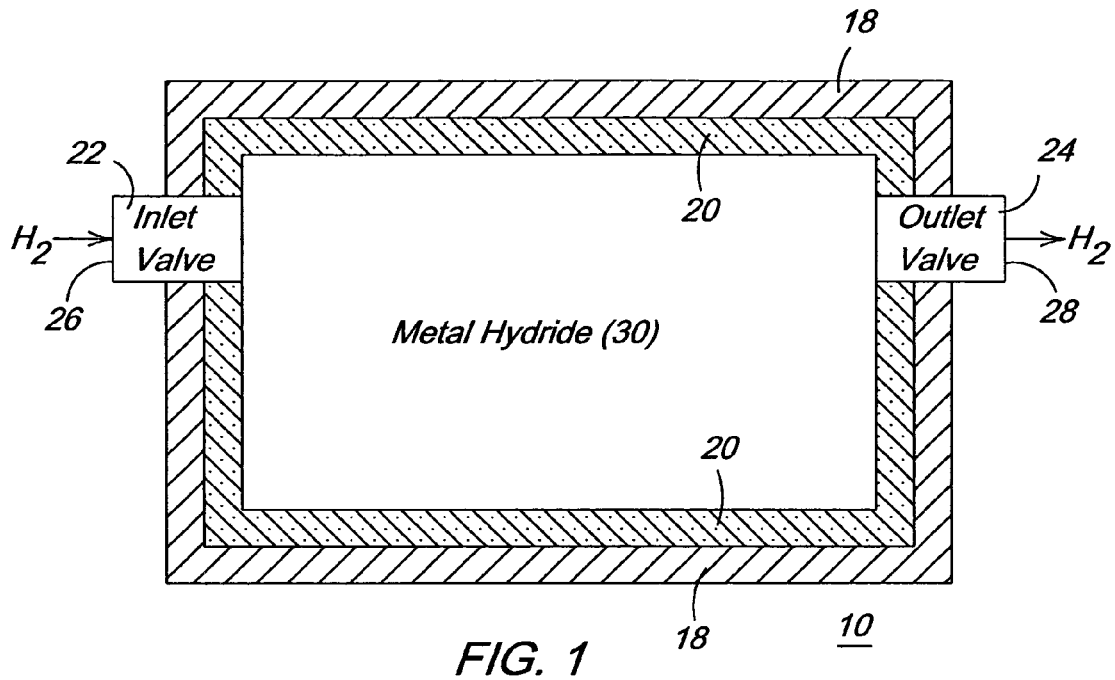
FIG. 1 shows a cross section of a first embodiment of a storage container in accordance with the invention.

FIG. 1 illustrates a first embodiment of a container 10 for storing a gaseous fuel, such as hydrogen. The container 10 comprises an outer shell 18 having an inlet 26 for inputting hydrogen gas and an outlet 28 for outputting hydrogen gas. An inlet valve 22 is associated with the inlet 26 for controlling the input of gas into the container. An outlet valve 24 is associated with the outlet 28 for controlling the exit of gas from the container. A thermally conductive liner 20 lines an interior of the outer shell 18. An inner hydride core 30 is in communication with the inlet 26 and the outlet 28 for storing the hydrogen gas.

Hydride is a binary compound of hydrogen, usually formed with a more electropositive element, such as a metal. The combination of the thermally conductive liner 20 and the inner hydride core 30 may form a storage system for gaseous fuel that is durable, resistant to fatigue, and supports rapid heat transfer in and out of the storage system.

The thermally conductive liner 20 may be configured in accordance with various alternate techniques. Under a first technique, the thermally conductive liner 20 comprises a carbon foam core. The carbon foam has a desired level of heat transfer and is generally non-rigid. Carbon foam may be composed of a carbon-fiber precursor or carbon-graphite that forms cellular matrix. The carbon foam may have spatial pockets that are capable of storing gas. Carbon foam is generally chemically inert and may be configured for high thermal conductivity. The compressive strength of carbon foam may be less than the burst strength of the container 10, such that the carbon foam liner 20 gives or allows some compression of the carbon foam upon exposure to the storage of higher pressure gas.

Under a second technique, the thermally conductive liner 20 comprises a carbon foam material that generally conforms to a shape of the metallic shell. Under a third technique, the thermally conductive liner 20 comprises a carbon foam coating that coats an interior of the outer shell 18. Under a fourth technique, the thermally conductive liner 20 comprises a graphite foam having a desired high thermal conductivity.

The thermally conductive liner 20 protects the metallic shell from hydride expansion during recharging of the container or tank with pressurized hydrogen gas. The thermally conductive liner 20 transfers heat from the hydrogen gas during filling or recharging or compressing of hydrogen gas within the container or tank to improve the ability to fully charge the tank and improve the accuracy of fuel readings.

In one embodiment, the outer shell 18 is constructed of a metallic material selected from the group consisting of steel, aluminum, a steel alloy, and an aluminum alloy.

Figure 2:
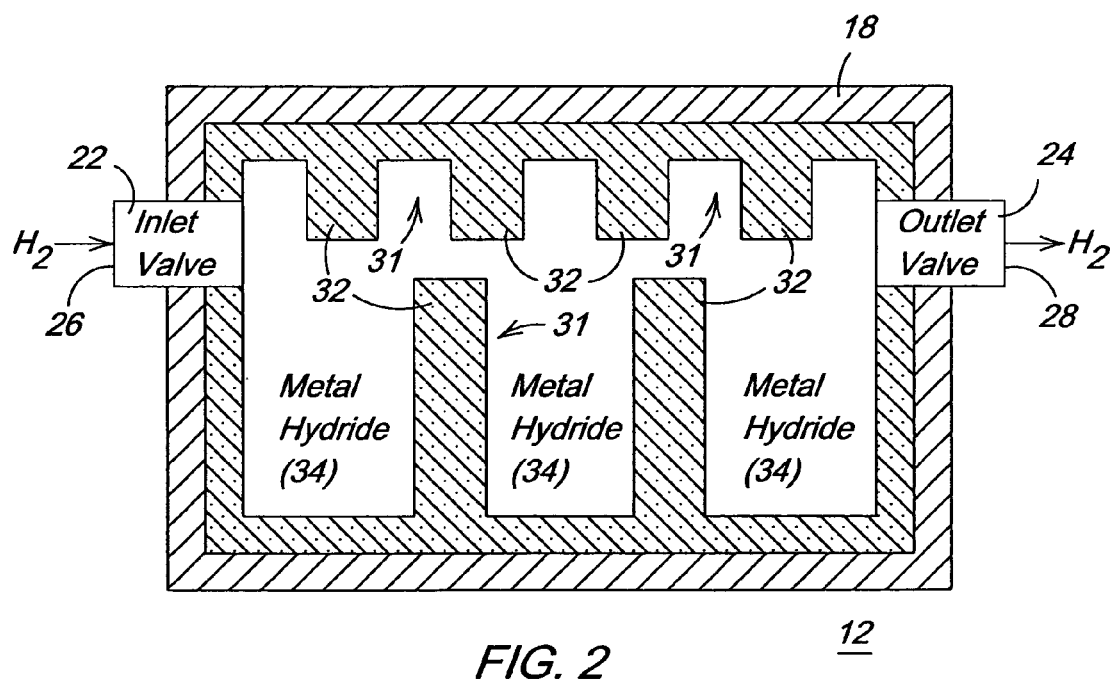
FIG. 2 shows a cross section of a second embodiment of a storage container in accordance with the invention.

FIG. 2 illustrates a second embodiment of the container 12. The container 12 of FIG. 2 is similar to the container 10 of FIG. 1 except the container 12 of FIG. 2 includes a thermally conductive liner 31. In one embodiment, the thermally conducive liner 31 comprises a carbon foam material with a series of fins 32 interspersed with the inner hydride core 34 to enhance thermal transfer of thermal energy between the inner hydride core 34 and the ambient environment around the container 12.

Figure 3:
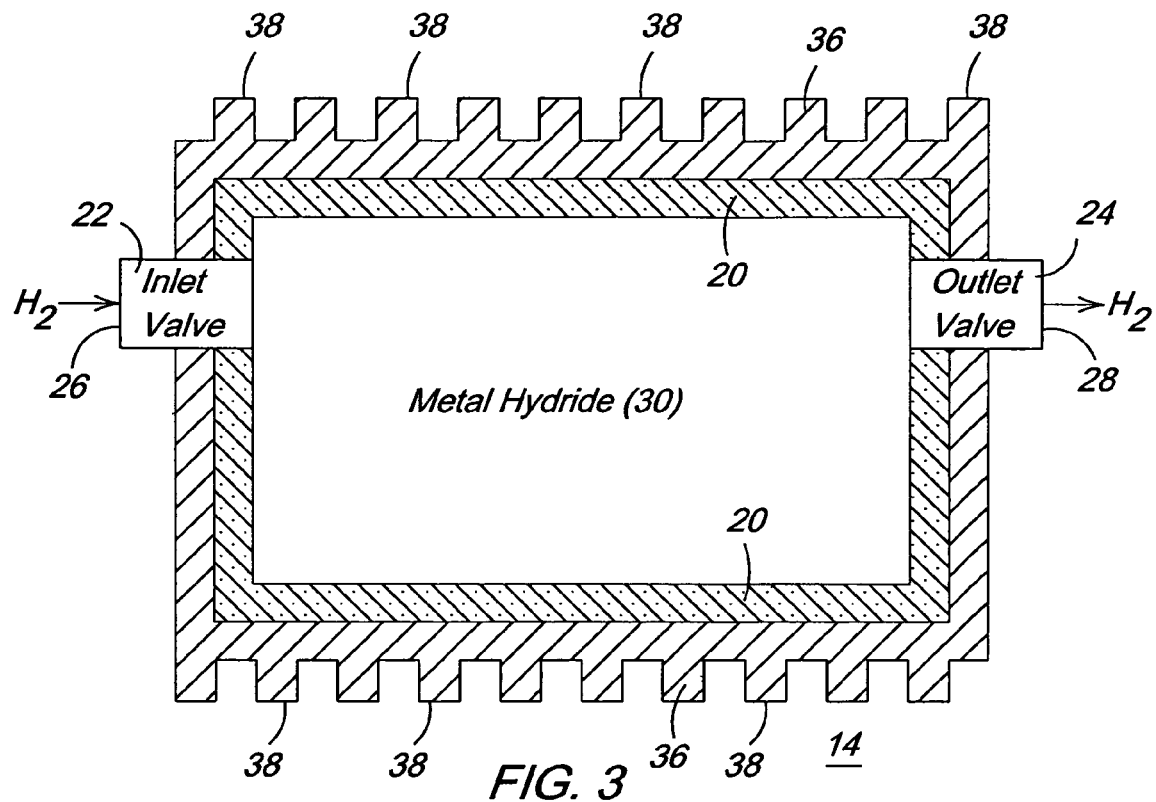
FIG. 3 shows a cross section of a third embodiment of a storage container having external fins for improved heat dissipation.

FIG. 3 illustrates a third embodiment of the container 14. The container 14 of FIG. 3 is similar to the container 10 of FIG. 1 except the container 14 of FIG. 3 further includes external fins 38 on the container 14 to enhance heat transfer from the container 14 to the ambient environment, where the ambient environment is cooler than the container. Although the container 14 is air-cooled as shown, in an alternate embodiment the container may be water-cooled or liquid-cooled by surrounding the tank with tubing or channels for conducting a coolant.

Figure 4:
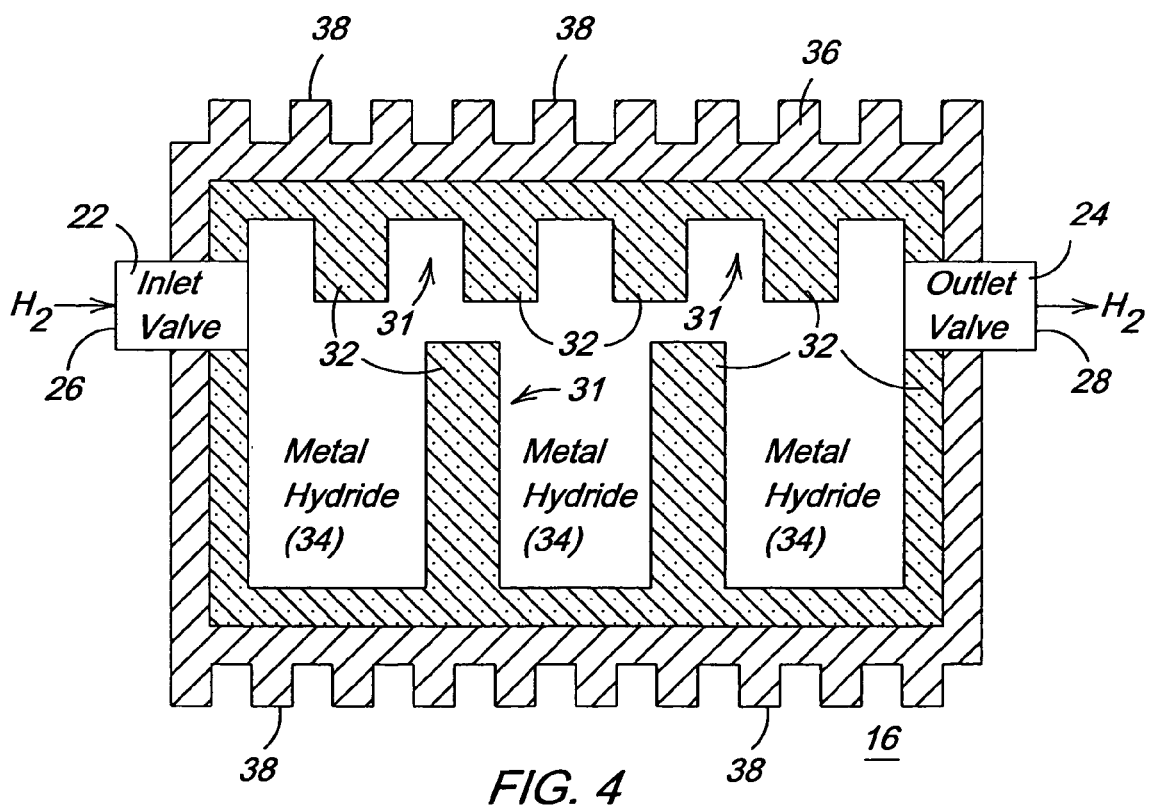
FIG. 4 shows a cross section of a fourth embodiment of a storage container having external fins for improved heat dissipation.

FIG. 4 illustrates a fourth embodiment of the container 16. The container 16 of FIG. 4 is similar to the container 12 of FIG. 2 except the container 16 of FIG. 4 further includes external fins 38 on the container 16 to enhance heat transfer from the container 16 to the ambient environment, where the ambient environment is cooler than the container. Although the container 16 is air-cooled as shown, in an alternate embodiment the container may be water-cooled or liquid-cooled by surrounding the tank with tubing or channels for conducting a coolant.

Any of the embodiments of the containers (10, 12, 14 or 16) described herein or variations thereof may be applied or incorporated into a vehicle. For example, the container may comprise a fuel tank of a hydrogen-powered vehicle selected from the group consisting of a fuel-cell vehicle and an internal combustion engine vehicle.

Having described various preferred embodiments, it will become apparent that various modifications can be made without departing from the scope of the invention as defined in the accompanying claims. For example, in one alternate embodiment, the input valve and the outlet valve may be replaced with a single valve that functions both as an inlet flow controller and an outlet flow controller.

What is claimed is:

1. A container for storing hydrogen comprising:
   an outer shell having an inlet for inputting hydrogen gas and outlet for outputting hydrogen gas;
   a thermally conductive liner lining an interior of the outer shell, the thermally conductive liner comprising a generally continuous carbon foam coating that adherently coats an interior of the outer shell; and
   an inner hydride core in communication with the inlet and outlet for storing the hydrogen gas.

2. The container according to claim 1 wherein the thermally conductive liner further comprises a carbon foam core.

3. The container according to claim 1 wherein the outer shell is constructed of a metallic material selected from the group consisting of steel, aluminum, a steel alloy, and an aluminum alloy.

4. The container according to claim 1 wherein the thermally conductive liner comprises a carbon foam material that generally conforms to a shape of the metallic shell.

5. The container according to claim 1 wherein the thermally conductive liner further comprises a carbon foam material with a series of fins interspersed with the inner hydride core to enhance thermal transfer of thermal energy between the hydride and the ambient environment around the container.

6. The container according to claim 1 wherein the thermally conductive liner protects the metallic shell from hydride expansion during recharging of the container or tank with pressurized hydrogen gas.

7. The container according to claim 1 wherein the thermally conductive liner transfers heat from the hydrogen gas during filling or recharging or compressing of hydrogen gas within the container or tank to improve the ability to fully charge the tank and improve the accuracy of fuel readings.

8. The container according to claim 1 wherein the container comprises a fuel tank of a hydrogen-powered vehicle selected from the group consisting of a fuel-cell vehicle and an internal combustion engine vehicle.

9. The container according to claim 1 wherein the outer shell comprises external fins for promoting heat dissipation from the container during recharging of the container.

* * * * *